United States Patent
Tonev et al.

(10) Patent No.: US 8,337,765 B2
(45) Date of Patent: Dec. 25, 2012

(54) ELECTROCATALYTICALLY INDUCED PROPELLANT DECOMPOSITION

(75) Inventors: Tihomir G. Tonev, Des Plaines, IL (US); Mark Kaiser, Prospect Heights, IL (US); Gary Seminara, Wonder Lake, IL (US)

(73) Assignee: Honeywell International Inc., Morristown, NJ (US)

( * ) Notice: Subject to any disclaimer, the term of this patent is extended or adjusted under 35 U.S.C. 154(b) by 1459 days.

(21) Appl. No.: 11/213,479

(22) Filed: Aug. 26, 2005

(65) Prior Publication Data

US 2007/0280865 A1 Dec. 6, 2007

(51) Int. Cl.
*B01J 19/08* (2006.01)

(52) U.S. Cl. ......... 422/186.04; 60/251; 60/256; 60/257; 60/258; 60/260

(58) Field of Classification Search ............. 422/186.04; 60/251, 256, 257, 258, 260
See application file for complete search history.

(56) References Cited

U.S. PATENT DOCUMENTS

| | | | |
|---|---|---|---|
| 3,651,644 A * | 3/1972 | Breen et al. ................... | 60/203.1 |
| 4,069,664 A * | 1/1978 | Ellion et al. ..................... | 60/258 |
| 4,527,389 A | 7/1985 | Biddle et al. | |
| 4,777,793 A | 10/1988 | Weigand et al. | |
| 4,927,542 A | 5/1990 | Fuchs et al. | |
| 4,938,932 A | 7/1990 | Burke | |
| 5,062,966 A | 11/1991 | Dotson et al. | |
| 5,485,722 A * | 1/1996 | Schmidt et al. ................. | 60/219 |
| 5,608,179 A * | 3/1997 | Voecks et al. ........................ | 89/7 |
| 5,836,150 A * | 11/1998 | Garcia ............................ | 60/256 |
| 5,909,001 A | 6/1999 | Goldstein | |
| 6,513,834 B1 | 2/2003 | Blomquist | |
| 6,931,832 B2 * | 8/2005 | Berg et al. ....................... | 60/206 |
| 2004/0226280 A1 | 11/2004 | Berg et al. | |

OTHER PUBLICATIONS

Klingenberg et al., "Electric Ignition of Han-Based Liquid Propellants," Contractor Report—Ballistic Research Laboratory—CR-639, Aug. 1990.
G. Klingerberg et al., "Electrical Ignition of HAN-Based Liquid Propellants", US Army Ballistic Research Laboratory, Aug. 1990.

* cited by examiner

*Primary Examiner* — Xiutu Tai
(74) *Attorney, Agent, or Firm* — Ingrassia Fisher & Lorenz, P.C.

(57) ABSTRACT

An apparatus and method to electrocatalytically induce the decomposition of a liquid propellant for propulsion. This is accomplished by providing a reaction chamber filled with catalyst that has a first electrode, such as near the center, and the other electrode disposed away from the first electrode. A charge source that is capable of applying voltage is connected to the electrodes. When the reaction chamber is dosed with a propellant such as an aqueous based amine propellant, such as HAN, an electric current flows between the electrodes and the propellant. This initiates the decomposition of the propellant which is driven to completion by the catalyst bed in order to be used for power generation.

17 Claims, 4 Drawing Sheets

ELECTROCATALYTICALLY INDUCED PROPELLANT DECOMPOSITION

BACKGROUND OF THE INVENTION

This invention relates to the use of a propellant power system for propulsion, and more particularly to a system that utilizes aqueous based amine propellant to propel objects, such as satellites, artillery shells; for orbital alignment of objects in space; or with aircraft emergency power units (EPU). This invention may employ a propellant power system that utilizes a method of electrically igniting a propellant such as hydroxylammonium nitrate (HAN) while in a non-catalytic (inert) or catalytic bed.

The EPU is a safety feature utilized in aircraft to quickly provide power in the event of failure of the primary and auxiliary engines. Different types of EPUs exist, such as ram air turbines, engine bleed air driven systems, and propellant power systems.

Propellant power system EPUs generate power from chemical energy from combustion or decomposition reactions that occur within a reaction chamber or catalytic bed. These systems are usually not dependant on aircraft airspeed or on the availability of engine bleed air. An example of a propellant power system EPU is used in the Lockheed-Martin F-16 single engine aircraft. Here, the EPU is up to speed within three seconds, and drives an electric generator and hydraulic pump for up to 10 minutes. It can operate on engine bleed for up to five hours. Typically, for EPU use, a catalytic bed is used about 5 different times before it should be replaced.

The EPU configuration includes a propellant supply system with a fuel injection port, a catalytic bed, a turbine wheel, a gearbox and a gearbox mounted hydraulic pump and electric generator. The propellant supply system stores the propellant until needed, and then delivers the required quantity to the reaction chamber for combustion.

Hydroxylammonium nitrate (HAN), also known as hydroxylamine nitrate, and oxammonium nitrate, has a chemical formula of $NH_2OH.HNO_3$ and $NH_3OH.NO_3$. This material has been used as a gun propellant, rocket propellant, and as a plutonium recovery agent. HAN is a hygroscopic material generally available in colorless water solutions. It is a byproduct in the fabrication of synthetic fiber. It can also be produced by electrolytic and ion exchange.

Presently, hydrazine may be used as a high-energy rocket propellant and as a reactant in military fuel. Hydrazine has a chemical formula of $N_2H_4$. Hydrazine is a highly reactive base and reducing agent.

U.S. Pat. No. 4,777,793 discloses an EPU whereby an igniter creates a spark that ignites a fuel rich ratio of a fuel and air mix to drive a turbine output shaft. This patent discloses a "preferred embodiment of high voltage pulse power" in paragraph 11, line 9. The combustion gas has a temperature of 760° C.-1010° C. (1400° F.-1850° F.). FIG. 5 of the '793 patent illustrates a combustion chamber 251, which may obtain temperatures of 982° C. (1800° F.). The combustion gasses then impinge on turbine 52, as illustrated in FIGS. 1, 3, and 4. This EPU cannot ignite at a cold start, such as when the propellant is around −40° C. (−40° F.). Further, the '793 EPU maintains a flame within the combustion chamber to heat the thermal lining 253 to the combustion temperature, or temperatures of up to 1800° F. (see column 6, line 53). Also, the operation of the unit requires an external source of +28 volts (see column 5, line 43).

U.S. Pat. No. 5,909,001 discloses a method of supplying a high pressure gas pulse to accelerate a firearm bullet. The oxidizer can be liquid HAN used in conjunction with a high voltage pulse power supply and high voltage electrodes. The peak voltage is in the 4 to 20 kilovolt range. The high voltage electrode 20 is illustrated in FIG. 1. FIG. 1 illustrates the high voltage electrode within a fuel mass contained in a housing. The housing is adjacent the bullet. However, this method will not work with low voltage.

U.S. Patent Publication No. 2004/0226280 discloses a high voltage coil coupled to a high voltage conductor, which is coupled to a spark electrode, to decompose a propellant. This publication discloses use of a "high voltage coil 80" in paragraph [0018]. Further, the decomposition chamber should be "hot enough to initiate the reaction (e.g., about 120-130° C. in a vacuum but potentially less with a catalytic bed)." See paragraph [0021]. The spark electrode has an operative distal end disposed outside of a catalytic bed. Low voltage will not trigger the combustion process. See paragraph [0018].

As can be seen, there is a need to: (1) utilize voltage or current to ignite an aqueous based amine propellant; and (2) ignite propellant at cold start, i.e. about −40° C. (−40° F.); without using added technology for thermal ignition, such as exhaust gas, which limits cold ground start utilization, or resistive heating elements, which requires excessive parasitic electric draw, or an open ignition source, such as a spark.

SUMMARY OF THE INVENTION

In one aspect of the invention, a propellant reaction ignition system, comprising a reaction chamber adaptable to receive a liquid propellant, said reaction chamber having a first portion and a second portion; a first electrode secured within said first portion of said reaction chamber; a second electrode having an opposite polarity from said first electrode, said second electrode secured to said second portion of said reaction chamber and disposed away from said first electrode; and a charge source in electrical contact with said first electrode and said second electrode.

In another aspect of the invention, a propellant reaction ignition system having a liquid propellant source capable of discharging a propellant, wherein the improvement comprises a catalytic bed located downstream of the liquid propellant source that delivers the propellant to said catalytic bed, said catalytic bed having a first portion and a second portion that is disposed away from said first portion; a first electrode secured within said first portion; a second electrode having a polarity that is opposite the polarity of said first electrode, said second electrode secured within said second portion; and a low voltage charge source electrically connected to said first electrode and said second electrode, said low voltage charge source capable of delivering an electric current through said first electrode, said second electrode, and the propellant when said catalytic bed is dosed with the propellant.

In yet another aspect, a reaction chamber for a propellant reaction ignition system, wherein the improvement comprises a catalytic bed having a first portion and a second portion; a low voltage charge source;

a first electrode connected to said charge source, said first electrode disposed in said first portion; a second electrode connected to said charge source, said second electrode disposed at a second portion; and a delivery member disposed upstream of said catalytic bed for the delivery of a liquid hydroxylammonium nitrate propellant to said catalytic bed.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

This invention is a system for inducing propellant decomposition through the use of an electric current, such that the resulting gases may be used for a method of propulsion. The invention uses a reaction chamber, such as either a non-catalytic bed (inert) or a catalytic bed that has two electrodes that are capable of applying the current to induce propellant decomposition. The present invention may employ low voltage to deliver such current. A charge source may provide the low voltage. When the reaction chamber is dosed with a propellant, such as an aqueous based amine propellant, the electrodes cause ignition of the propellant. This ignition initiates the combustion to provide power.

The present invention may be used, but is not limited, to propel spacecraft, orbitally align objects in space, to project artillery shells, or for power generation, such as in Emergency Power Units (EPU) in aircraft.

The reaction ignition system of the present invention may be used to create power in the event of the failure of the engine's primary or secondary (auxiliary) power source, hence the term Emergency Power Unit.

In one exemplary embodiment of the present invention, if power failure or engine flameout occurs, the aqueous based amine propellant, such as one containing liquid HAN, may be manually or automatically injected in a catalytic bed for ignition, thus creating power. In an EPU a rapid ignition may be critical, even at cold temperatures. In contrast to the prior art, the present invention does not require high voltage, does not require pre-heating of a thermal lining, and it does not require the application of an excessive external energy source to initiate the reaction. These functions are accomplished by the structure of the present invention. This structure includes the catalytic bed with at least two electrodes operable within the catalytic bed. The electrodes are connected to a charge source. This structure is not disclosed in the prior art.

The invention may differ from the prior art in several respects. For example, the present invention may use low voltage to ignite a liquid propellant, when the liquid propellant is at a cold-start temperature. The cold start temperature may be between about −60° C. (−76° F.) to about 120° C. (248° F.).

Figure 1:
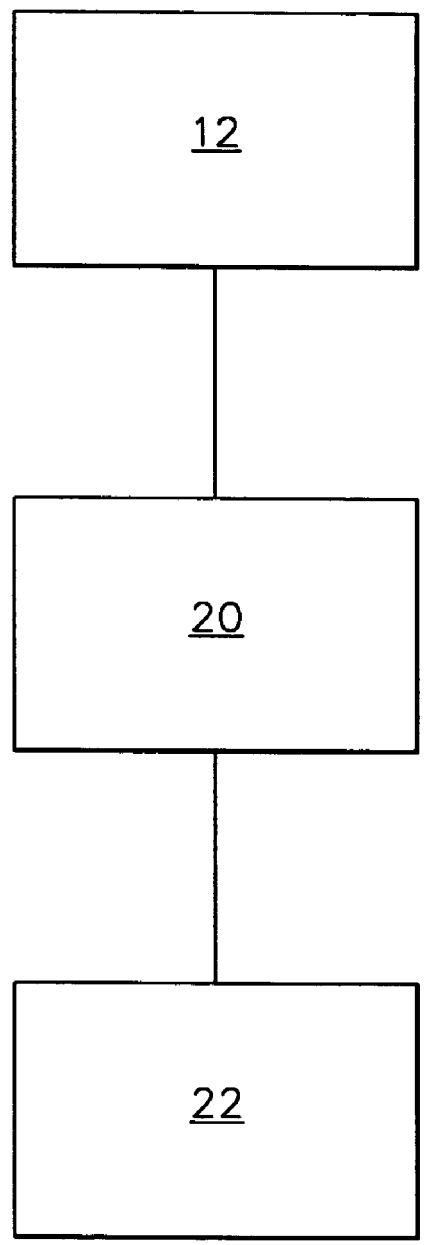
FIG. 1 is a block diagram of a propellant supply system, a reaction chamber, and a turbine wheel according to the when the present invention is used in an EPU application.

FIG. 1 illustrates a general overview of the propellant combustion system as demonstrated as a propulsion system for an EPU, which uses a turbine to generate power. Typically, a propellant supply system 12 is disposed upstream of a reaction chamber 20, such as one containing either a non-catalytic bed having inert properties, or a catalytic bed. The reaction chamber 20 is upstream of a turbine wheel 22. An EPU may comprise ram air turbines, engine bleed air driven systems, or propellant power systems. The present invention is a propellant power system.

Figure 2:
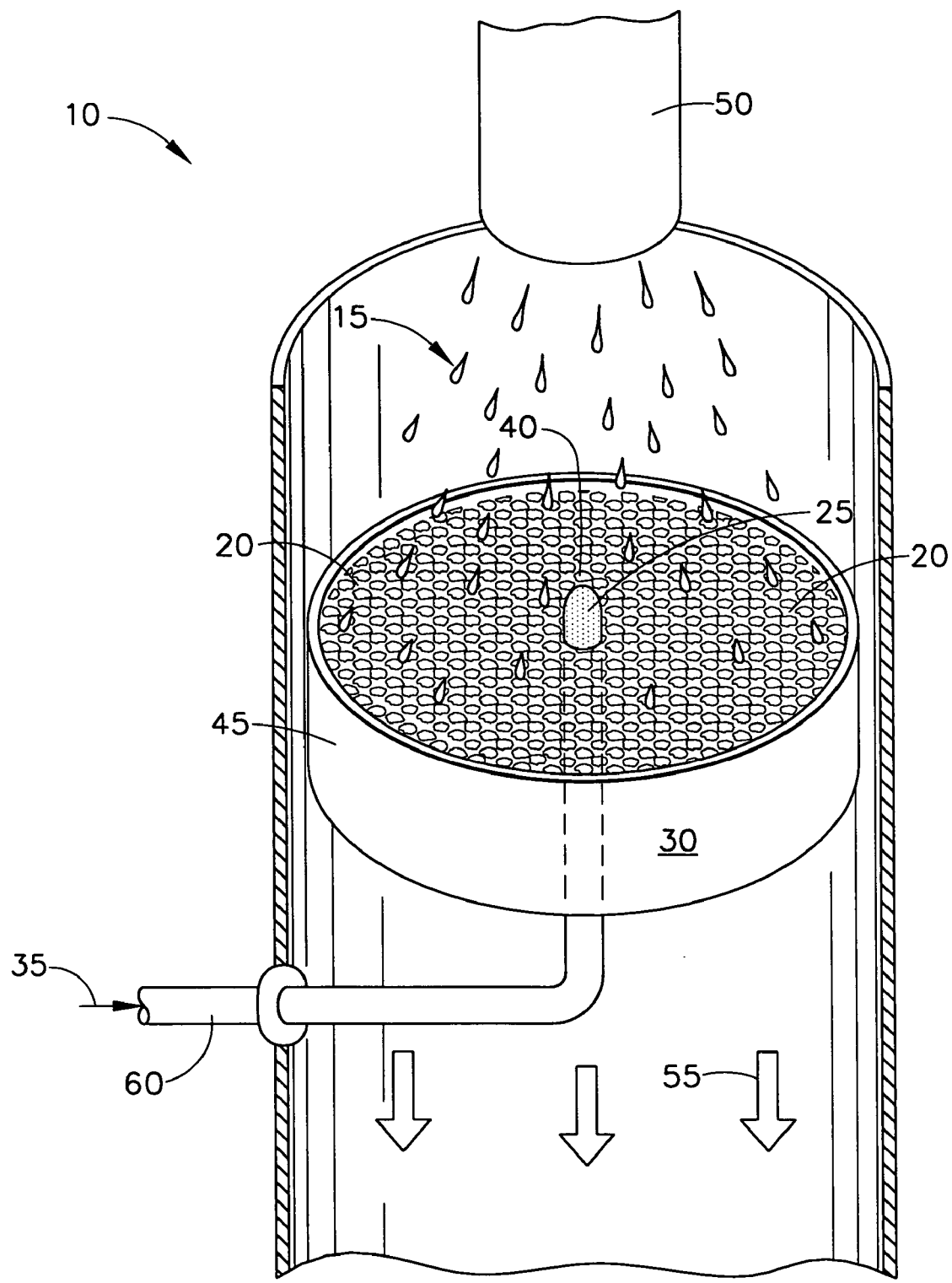
FIG. 2 is a pictorial view of a system for an electrically induced propellant ignition according to the present invention.

As illustrated in FIG. 2, the reaction ignition system 10 may be located downstream of a delivery member or fuel injection port 50, from which the propellant fuel, such as HAN 15, may be delivered to the reaction chamber 20. In an exemplary embodiment, the aqueous based amine propellant fuel, also referred to herein as liquid propellant, such as HAN may be delivered to the reaction chamber 20 by pulsed doses. In another embodiment, the liquid propellant, such as HAN may be delivered to the reaction chamber 20 by a continuous stream. Downstream from the reaction chamber 20 may be a turbine. The HAN reaction ignition system 10 may be comprised of a reaction chamber 20—the reaction chamber may have inert properties such as a non-catalytic bed. The non-catalytic bed may be an inert material, in a form such as a sponge, granular or palletized media which and may be comprised of materials such as quartz or an alumina. The reaction ignition system may be comprised of a reaction chamber—the reaction chamber 20 comprised of a catalytic bed. And in addition to the reaction chamber 20, the present invention further may have a first electrode 25 and second electrode 30 disposed within said reaction chamber 20, and a charge source 35 that may be in electrical contact with the first electrode 25 and second electrode 30.

Figure 3:
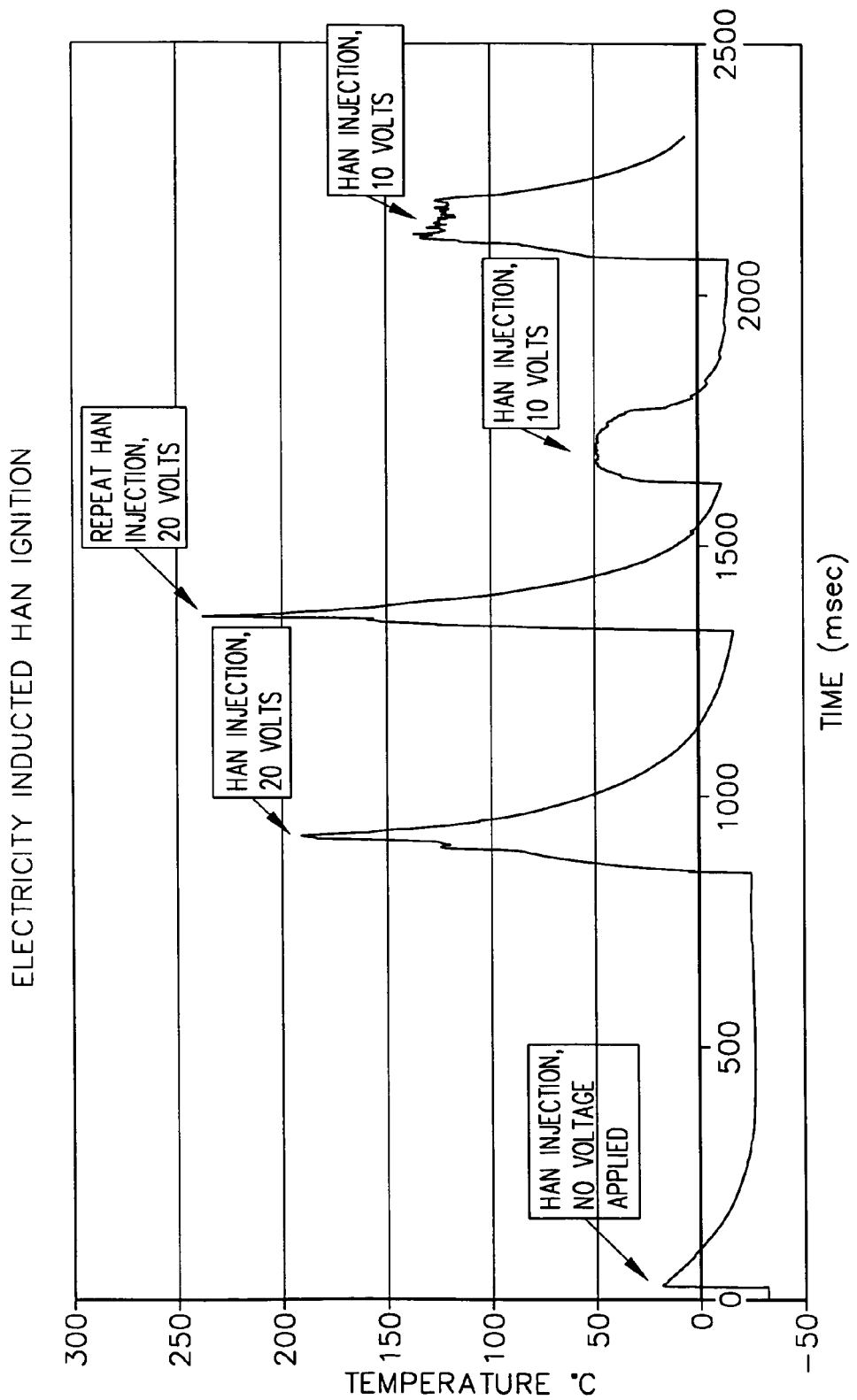
FIG. 3 is a graph of an applied voltage in relation to time and a resulting temperature of HAN, according to the present invention.

This invention may use low voltage to ignite the liquid propellant, such as HAN 15. FIG. 3 illustrates that a low voltage of 20 volts may cause the HAN temperature to reach 175° C. (347° F.), which may decompose the HAN for energy use by the turbine, or an accessory, such as a fuel pump. The catalytic bed may not have to be heated above 60° C. (140° F.) for HAN 15 ignition. The method of ignition of the present invention may eliminate the need for heating the bed and may allow for cold start of the EPU on takeoff, or other emergency environments. The injection port 50 may be commonly an overpressurized nitrogen vessel, whereby a valve may open to inject the HAN 15 onto the catalytic bed 20. Although 20 volts may be desirable, an acceptable range is anywhere between 1 and 1000 V, but preferably between 10 to about 30 volts.

The reaction chamber 20 may be one of a variety of configurations. One non-limiting example may be a reaction chamber having inert properties, such as a non-catalytic bed that is made of quartz or alumina. Another non-limiting example may be a granular catalytic bed, which may be a catalytic bed consisting of randomly shaped particles usually with a specific size mesh, packed in a reactor of specified dimensions.

An alternate non-limiting example may be a pelletized catalytic bed which may consist of particles of a specific shape and size packed in a reactor of specified dimensions. A further non-limiting example may be a monolithic catalytic bed which may be either formed into a shape or deposited on a surface which may allow for optimal gas flow through the reactor bed.

Any hardened catalyst or metal supported catalyst may be used in the present invention. In one exemplary embodiment the catalytic bed 20 may consist of any Group VIII metal catalyst. Group VIII metals include the group consisting of iron, cobalt, nickel, ruthenium, rhodium, palladium, osmium, iridium, platinum, hassium, meitnerium, or ununnilium. In one exemplary embodiment, the catalytic bed 20 may be 33% weight iridium, and supported on alumina in granular form. However, this may vary to be less then 33% or greater than 33%. Other than iridium, the catalytic bed 20 may be 33% weight of another Group VIII metal catalyst.

One suitable commercially available catalytic bed 20 may be the Honeywell 405 Catalyst™, previously known as the Shell 405. This catalytic bed 20 is also known in the art as a "Shell 405" catalytic bed. As described in U.S. Pat. No. 4,069,664, this catalytic bed may have two zones, the first zone may have 20 to 30 mesh size granular catalyst between 0.033 and 0.021 inches and the second zone may have 14 to 18 mesh size granular catalyst between 0.047 and 0.037. Alternatively, the catalytic bed 20 may include palletized or powder preparations, as compared with the granular form, or a monolithic catalytic bed.

The first electrode 25 may be disposed near a first portion 40 of the reaction chamber 20, non-catalytic bed 20, or catalytic bed 20. The first portion 40 may be defined as any given point within the catalytic bed 20. In one exemplary embodiment, the first electrode 25 may be secured at a center portion 42. The center portion 40 may be the point around which a circle or sphere may be described; a point that may be related to a geometrical figure in such a way that for any point on the figure there may be another point on the figure such that a straight line joining the two points may be bisected by the original point, also called the center of symmetry; or the center of the circle inscribed in a regular polygon.

The first electrode 25 may extend away from the reaction chamber 20, non-catalytic bed 20, or catalytic bed 20 to a charge source 35. The first electrode may be disposed within an insulation seal 60. In a non-limiting further example, the first electrode 25 can change its polarity, and thus the first electrode 25 can act as either an anode or a cathode.

A second electrode 30 may be positioned near a second portion 45 within the reaction chamber 20, non-catalytic bed 20, or catalytic bed 20. The second portion 45 may be defined as a point having a location other than that of the first portion 40. In one exemplary embodiment, the second portion 45 may be located near an outer portion 46 of the reaction chamber 20, non-catalytic bed 20, or catalytic bed 20. The outer portion 46 may be defined as being disposed away from the center portion 42. In one exemplary embodiment, the catalyst may be circular, and the second electrode 30 may be positioned near the circumferential portion 48 of the catalytic bed 20. The circumferential portion 48 may be defined as the outermost edge of the catalytic bed 20.

The first electrode 25 and the second electrode 30 may be operably or electrically connected to a charge source 35, such as, but not limited to, a capacitor or battery. In one exemplary the first electrode 25 may be a point electrode, and the second electrode 30 may be an annular electrode that may be secured to, and may surround, the circumferential portion 48.

Alternatively the second electrode 30 may be a point electrode. In a further exemplar, the second electrode 30 may be made of multiple point or annular electrodes, or both. Alternatively, the first electrode 25 may comprise multiple electrodes, rather than the use of one single electrode 25.

Desirably, the electrodes 25, 30 may be carbon based, or based on another anti-corrosive material. One electrode may act as a cathode; the other may have an opposite polarity, and thus act as the anode.

FIG. 3 is a graph that displays an applied voltage and the resulting HAN reaction temperature as it is delivered within the catalytic bed 20. Specifically, the graph displays the time in milliseconds on the abscissa, and the resultant HAN reaction 15 temperature on the ordinate, which may occur as a result of the chemical reaction that is induced by the electrodes 25, 30. The Figure illustrates that for the combustion of HAN 15 to practically occur, the HAN reaction 15 temperature should be above 100° C. (212° F.) at standard pressure. However, the temperature of the HAN 15 as it is delivered to the catalytic bed 20 can be from about −60° C. (−76° F.) to about 120° C. (248° F.).

As illustrated in FIG. 3, once the liquid propellant, such as HAN is delivered to the reaction chamber 20, non-catalytic bed 20, or catalytic bed 20 with about a 20V load applied to the first electrode 25 and the second electrode 25, the HAN temperature can be displaced from about −25° C. (−13° F.) to about 175° C. (347° F.) in about 50 milliseconds. This temperature of about 175° C. (347° F.) decomposes the HAN for energy use by the turbine, or other means.

As further illustrated in FIG. 3, a repeat HAN injection within 500 milliseconds, with an applied voltage of 20V over the first electrode 25 and second electrode 30, produces a HAN temperature of about 237° C. (459° F.).

FIG. 3 also illustrates the HAN temperature results when 10V are applied across the electrodes 25, 30, while the catalytic bed 20 is dosed with the HAN 15. A 10V load enables the HAN 15 to reach temperatures of about 50° C. (122° F.) after the first HAN injection, and to about 137° C. (279° F.) after the second HAN injection that is delivered within about 500 milliseconds.

Figure 4:
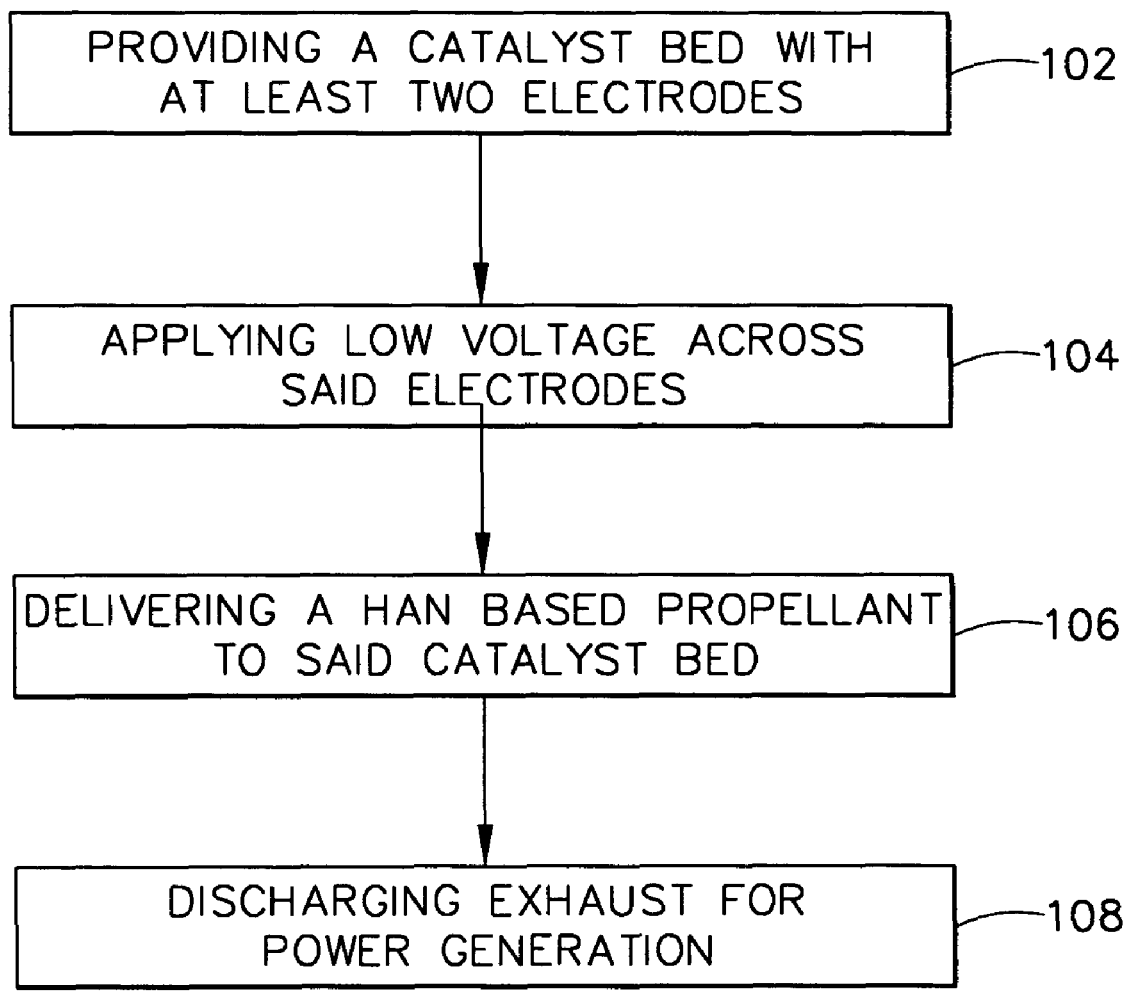
FIG. 4 is a block diagram of an exemplary method for electrically inducing a propellant according to the invention.

FIG. 4 illustrates an exemplary method 100 of igniting a propellant, which may comprise the steps of providing a reaction chamber, non-catalytic bed, or catalytic bed with at least two electrodes disposed within the reaction chamber, non-catalytic bed, or catalytic bed 102; applying voltage across said electrodes 104; delivering the propellant to the reaction chamber, non-catalytic bed, or catalytic bed 106; and discharging the exhaust for power generation.

In operation, once the reaction chamber 20, non-catalytic bed 20, or catalytic bed 20 is dosed with the liquid propellant, such as HAN 15, the liquid propellant, such as HAN 15 may contact the first electrode 25 and the second electrode 30, which may then ignite the HAN 15, providing power via the exhaust 55.

The liquid propellant 15 may be delivered to the reaction chamber 20, non-catalytic bed 20, or catalytic bed 20 at temperatures of about −40° C. (−40° F.). Non-catalytic or Catalytic ignition may be limited to a temperature of >60° C. (>140° F.). In one exemplary embodiment, liquid propellant 15 may be HAN 15 and may be injected at −40° C. (−40° F.).

Therefore an electric charge may be passed through a reaction chamber 20, non-catalytic bed 20, or catalytic bed 20 when dosed with HAN 15, via the electrodes 25, 30. Ignition may occur instantaneously, decomposing the HAN 15. The reaction may be $NH_3OH.NO_3 \rightarrow NO_x + H_2O$, or $NH_2OH.HNO_3 \rightarrow NO_x + H_2O$.

Further, the HAN 15, which is an aqueous solution, may be combined with other materials in order to change the propellant properties and reaction temperatures. Two examples of materials that HAN may be combined with are methanol ($CH_3OH$) or triethylammonium nitrate (TEAN). The HAN+TEAN reaction may be $7NH_3OH.NO_3 \rightarrow (HOCH_2CH_2)_3N.HNO_3 \rightarrow 6CO_2 + 8N_2 + 22H_2O$ creating a flame temperature of 1759° C. (3199° F.).

Typically, the HAN 15 is in an aqueous phase, which means that it is mixed with a water to form a solution. This is both for stability and handling properties. It is typical for HAN based propellants to be formulated from 50-70 wt % HAN, 10-30 wt % TEAN, and 10-30 wt % water. The HAN:TEAN molar ratio may be 7 (the value required for $N_2/CO_2$ stoichiometry), and the amount of water present controls physical properties such as energy content. The HAN 15 reaction generally produces steam, $N_2$, and $NO_x$.

Although different ratios will work, the desired volume of the catalytic bed 20 to the volume of the HAN 15 ratio may be less than 1.1 mL/min/g catalyst.

The liquid propellant solution 15, such as HAN 15 acts as a conduit to complete a circuit between the first electrode 25 and the second electrode 30. The HAN may also create resistance between the electrodes 25, 30. Differences in composition of the HAN 15 may create differences in the resistance that it creates. The quantity and rate of injection may change resistance of the fluid and thus may affect the current draw of the system.

After combustion, the exhaust 55 may be vented to the open atmosphere towards the turbine. The temperature of the exhaust 55 may vary between 100° C. and 1200° C. (212° F. and 2192° F.).

It should be understood, of course, that the foregoing relates to exemplary embodiments of the invention and that modifications may be made without departing from the spirit and scope of the invention as set forth in the following claims.

We claim:

1. A propellant reaction ignition system, comprising:
   a reaction chamber adapted to receive a hydroxylammonium nitrate-based liquid propellant;
   a non-heated catalytic bed disposed within said reaction chamber, said catalytic bed being non-electrically conductive and having a first portion and a second portion;
   a first electrode secured within said first portion of said catalytic bed;
   a second electrode having an opposite polarity from said first electrode, said second electrode secured to said second portion of said catalytic bed and disposed away from said first electrode; and
   a charge source electrically coupled to said first electrode and said second electrode, said charge source configured to supply a voltage potential of between 10 to about 30 volts across the first electrode and the second electrode to thereby cause electric current to flow therebetween, wherein:
      said electric current only flows between said first electrode and said second electrode when said liquid propellant contacts said first electrode and said second electrode, and
      said electric current, when flowing between said first electrode and said second electrode, causes instantaneous decomposition of said liquid propellant into decomposition products, thereby causing combustion of said liquid propellant decomposition products in said catalytic bed.

2. The propellant reaction ignition system of claim 1, wherein said first electrode is a point electrode and said first portion is located at a center portion of said catalytic bed.

3. The propellant reaction ignition system of claim 1, wherein said second portion is located at an outer portion of said catalytic bed.

4. The propellant reaction ignition system of claim 1, wherein said second electrode is an annular electrode and said second portion is located at a circumferential portion of said catalytic bed.

5. The propellant reaction ignition system of claim 1, wherein said catalytic bed contains a catalyst consisting of any Group VIII metal catalyst.

6. The propellant reaction ignition system of claim 1, wherein said catalytic bed comprises about 33% iridium and further comprises randomly shaped particles with a specific size mesh, said catalytic bed comprising 14 to 18 mesh size granular catalyst between 0.047 and 0.037 inches.

7. The propellant reaction ignition system of claim 1, wherein said catalytic bed comprises about 33% iridium and further comprises randomly shaped particles with a specific size mesh, said catalytic bed comprising two zones, a first zone with a 20 to 30 mesh size granular catalyst between 0.033 and 0.021 inches and a second zone that contains 14 to 18 mesh size granular catalyst between 0.047 and 0.037 inches.

8. The propellant reaction ignition system of claim 1, further comprising a plurality of said second electrodes, wherein said second electrodes are point electrodes disposed at an outer portion of said catalytic bed.

9. The propellant reaction ignition system of claim 1, wherein the volume of said reaction chamber with respect to the volume of the liquid propellant that is received by said catalytic bed is less than about 20 mL/min/g catalyst.

10. The propellant reaction ignition system of claim 1, wherein said second electrode is an annular electrode.

11. The propellant reaction ignition system of claim 1, wherein the volume of said reaction chamber with respect to the volume of the liquid propellant that is received by said catalytic bed is less than about 1.1 mL/min/g catalyst.

12. A propellant reaction ignition system having a liquid propellant source capable of discharging a liquid propellant, wherein the improvement comprises:
   a non-heated, non-electrically conductive catalytic bed located downstream of the liquid propellant source that delivers the propellant to said catalytic bed, said catalytic bed having a first portion and a second portion that is disposed away from said first portion;
   a first electrode secured within said first portion;
   a second electrode having a polarity that is opposite the polarity of said first electrode, said second electrode secured within said second portion; and
   a low voltage charge source electrically connected to said first electrode and said second electrode, said low voltage charge source configured to supply a voltage potential of between 10 volts and about 30 volts across said first electrode and said second electrode, to thereby cause electric current to flow through said first electrode, said second electrode, and the propellant only when said catalytic bed is dosed with the liquid propellant, wherein said electric current electrolytically decomposes said liquid propellant and instantaneously ignites in said catalytic bed.

13. The propellant reaction ignition system of claim 12, wherein said low voltage source is a capacitor.

14. The propellant reaction ignition system of claim 12, wherein the liquid propellant is a hydroxylammonium nitrate-based liquid propellant, and the electric current results in the reaction of the hydroxylammonium nitrate-based liquid propellant achieving a resultant rise of a temperature to about 100° C. (212° F.).

15. The propellant reaction ignition system of claim 14, wherein the hydroxylammonium nitrate and propellant reaction ignition system is >−60° C. (−76° F.) when the propellant is delivered to said catalytic bed.

16. A reaction chamber for a propellant reaction ignition system, wherein the improvement comprises:
   a non-heated, non-electrically conductive catalytic bed having a first portion and a second portion;
   a low voltage charge source configured to supply current at a voltage potential of about 20 volts;
   a first electrode connected to said charge source, said first electrode disposed in said first portion, the first portion being at a center portion of the catalytic bed;

a second electrode connected to said charge source, said second electrode disposed at said second portion, the second portion being an outermost circumferential edge of the catalytic bed; and a delivery member disposed upstream of said catalytic bed for the delivery of a liquid hydroxylammonium nitrate (HAN) propellant to said catalytic bed, wherein:

said current flows from said low voltage charge source and between said first electrode and said second electrode only when said liquid HAN propellant contacts said first electrode and said second electrode, and said electric current, when flowing between said first electrode and said second electrode, causes instantaneous decomposition of said liquid HAN propellant into decomposition products, thereby causing combustion of said liquid HAN propellant decomposition products in said catalytic bed.

17. The reaction chamber for a propellant reaction ignition system of claim 16, wherein said charge source produces about a 20 volt load that is applied to said first electrode and said second electrode.

\* \* \* \* \*